United States Patent [19]
Holly

[11] 3,770,216
[45] Nov. 6, 1973

[54] SUBDIVIDED MEAT MIXER AND GRINDER
[75] Inventor: James A. Holly, Park Forest, Ill.
[73] Assignee: Hollymatic Corporation, Park Forest, Ill.
[22] Filed: Mar. 10, 1972
[21] Appl. No.: 233,578

[52] U.S. Cl. ............................ 241/82.1, 241/101 B
[51] Int. Cl. .......................... B02c 18/00, B01f 7/04
[58] Field of Search ................. 241/82.1, 82.2, 82.3, 241/82.4, 82.5, 82.6, 82.7, 101.2, 101 B, 101.7, 76

[56] References Cited
UNITED STATES PATENTS

| 3,450,180 | 6/1969 | Braun | 241/82.5 |
| 3,548,903 | 12/1970 | Holly | 241/82.1 |
| 2,200,786 | 5/1940 | Ardrey | 241/82.4 |
| 3,570,569 | 3/1971 | Hartley et al. | 241/82.6 |
| 3,599,687 | 11/1969 | Tschantz | 241/82.6 |

Primary Examiner—Willie G. Abercrombie
Attorney—Ernest A. Wegner et al.

[57] ABSTRACT

A mixing and grinding apparatus for subdivided grindable material such as coarsely cut raw meat having a mixing chamber for the material, mixing elements including a shaft and mixing blade means thereon, a grinder having an access opening between the mixing chamber and the grinder housing, a clamping device for clamping together the wall of the mixing chamber and the housing of the grinder to provide a substantially fluid tight seal between access openings in the mixing chamber and the grinder housing and a securing device operated by the clamping means for simultaneously releasably securing the chamber on a supporting frame while clamping the mixing chamber wall to the grinder housing.

9 Claims, 12 Drawing Figures

PATENTED NOV 6 1973

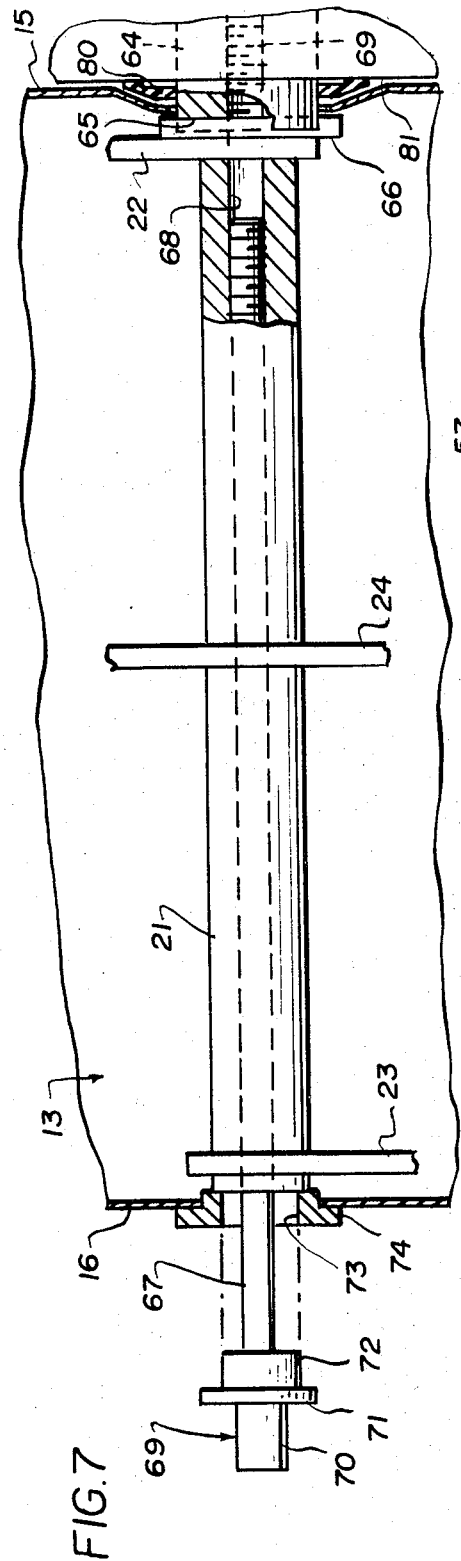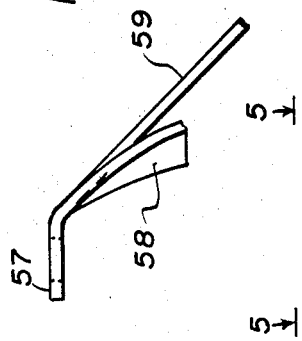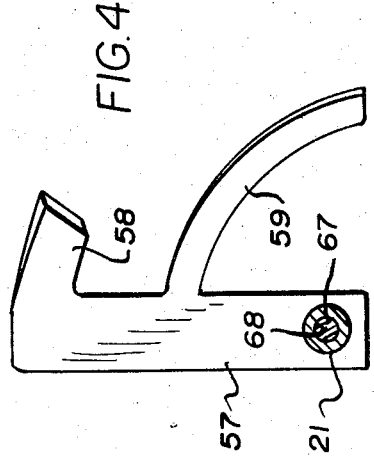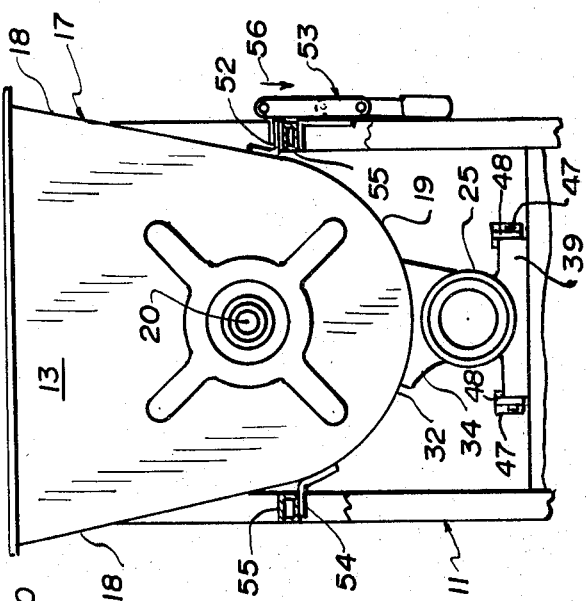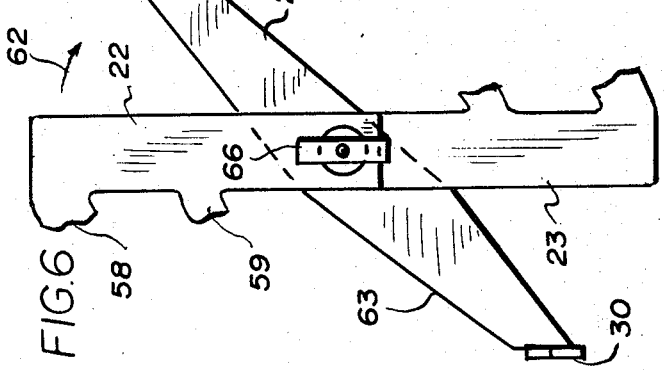

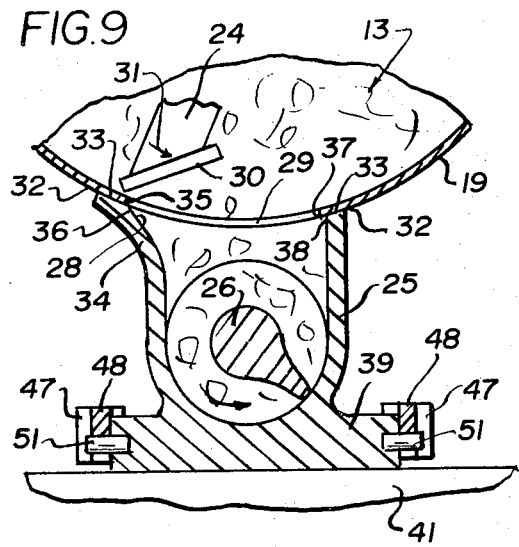
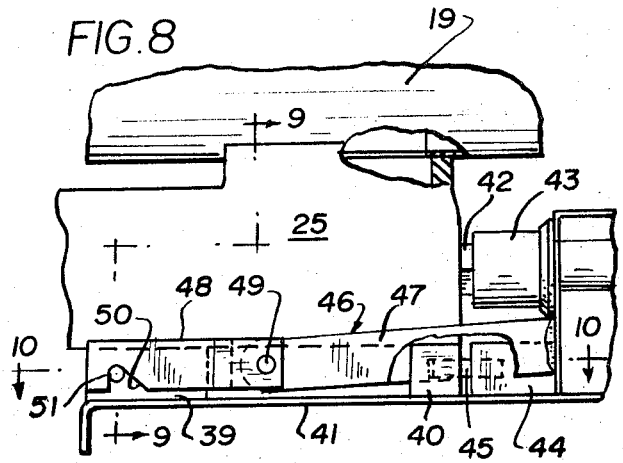
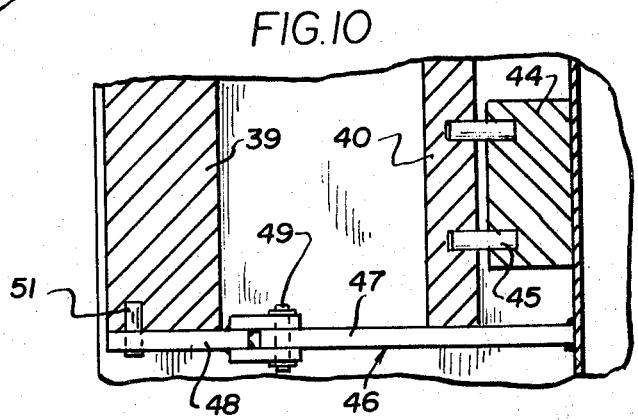
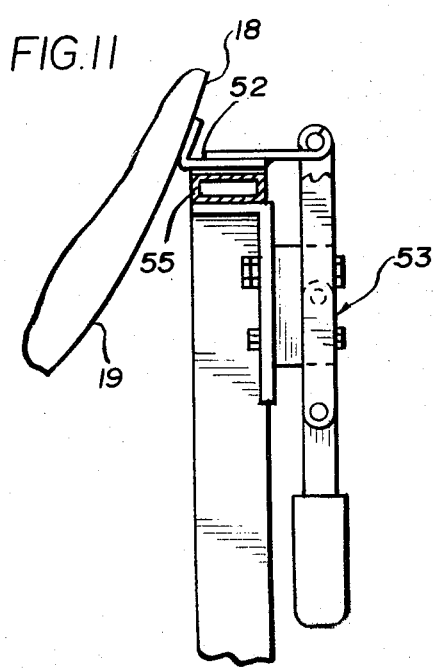
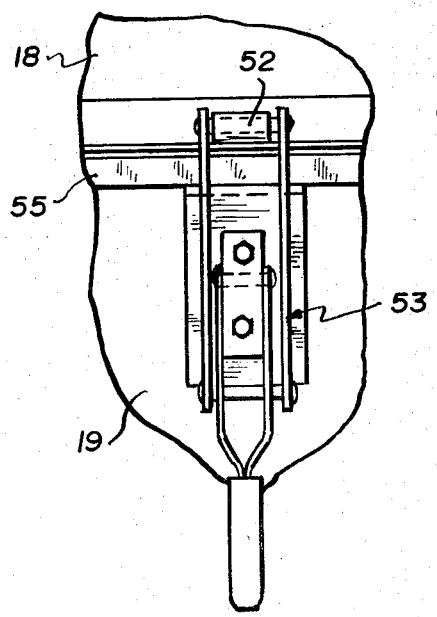

SUBDIVIDED MEAT MIXER AND GRINDER

BACKGROUND OF THE INVENTION

This invention relates to a mixing and grinding apparatus having a supporting frame, a mixing chamber held thereon, a grinder having a housing communicating with the chamber through access opening means and a motor drive for rotating the mixing means within the chamber together with improved means for fastening the various parts of the apparatus together for operation and for rapid disassembly for cleaning purposes.

Another feature of the invention is to provide such a mixing and grinding apparatus having improved mixing blade means within the mixing chamber providing rapid and efficient mixing prior to the grinding of the material.

The most pertinent prior art of which applicant is aware are his own prior U.S. Pat. Nos. 3,506,019; 3,548,902 and 3,548,903 and U.S. Pat. No. 3,450,180.

BRIEF DESCRIPTION OF THE DRAWINGS

FIG. 3 is an end elevational view partially broken away and taken from the left end of FIG. 1.

FIG. 4 is a sectional elevational view taken substantially along line 4—4 of FIG. 2.

FIG. 5 is a plan view of the mixing blade means of FIG. 4 viewed from substantially the line 5—5 of FIG. 4.

FIG. 6 is a side elevational view partially broken away of the mixing means detail of the apparatus and viewed from substantially the line 6—6 of FIG. 2.

FIG. 7 is a fragmentary enlarged plan view partially in section of the mixing means of the apparatus partially disassembled as for cleaning.

FIG. 8 is a fragmentary side elevational view partially broken away and partially in section of the bottom of the apparatus.

FIG. 9 is a sectional view taken substantially along the line 9—9 of FIG. 8.

FIG. 10 is a sectional view taken substantially along line 10—10 of FIG. 8.

FIG. 11 is a fragmentary enlarged sectional view taken substantially along line 11—11 of FIG. 1.

FIG. 12 is a fragmentary side elevational view taken from the right side of FIG. 11.

DESCRIPTION OF THE PREFERRED EMBODIMENT

Figure 1:
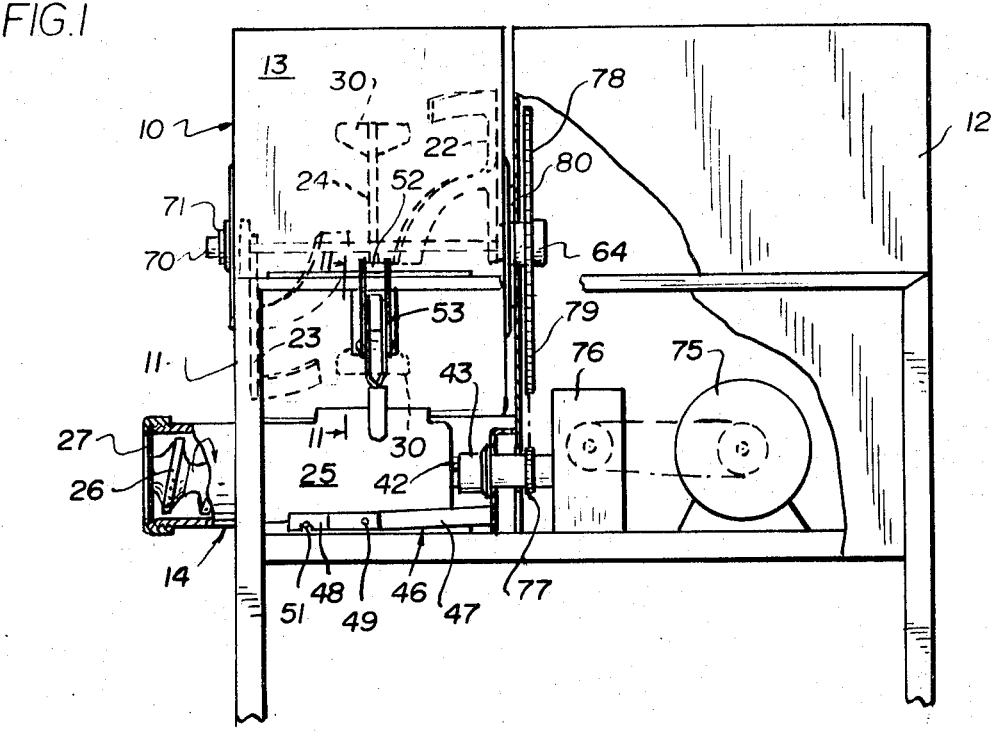
FIG. 1 is a side elevational view partially broken away and partially in section of an apparatus embodying the invention.

In the embodiment illustrated in the drawings the apparatus 10 for mixing and grinding subdivided grindable material such as coarsely cut meat and particularly raw beef comprises a supporting frame 11, a machinery compartment 12 on the rear thereof and a mixing chamber 13 on the other end and a grinder apparatus 14 supported by the frame beneath the mixing chamber 13 and in front of the machinery compartment 12.

The mixing chamber has side walls 15 and 16 and as shown most clearly in FIG. 3 a peripheral wall 17 with upwardly and outwardly diverging top sections 18 and an arcuate bottom section 19 that is beneath a transverse horizontal axis 20 of rotation for rotatable mixing means within the chamber. In the illustrated embodiment the bottom wall section 19 is substantially concentric with the axis 20 and extends for somewhat less than 180°.

Figure 2:
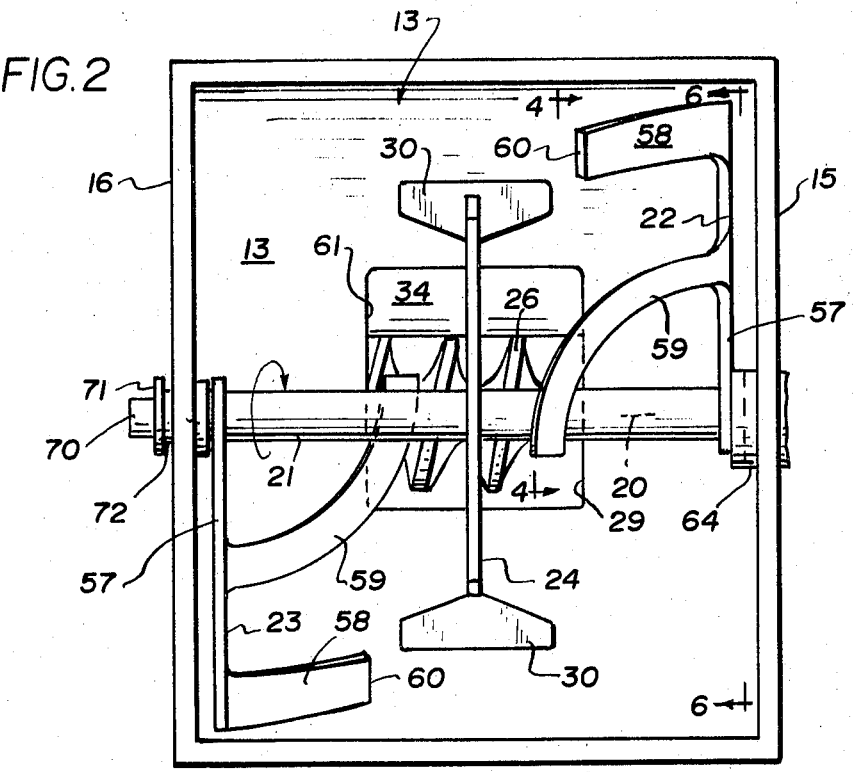
FIG. 2 is a partial plan view of the apparatus.

Located within the mixing chamber 13 is a mixing means including a shaft 21 extending across the chamber at the axis of rotation and rotatable therearound and mixing blade means 22, 23 and 24 spaced along the shaft 21 as illustrated in FIG. 2. As is illustrated there the mixing blade means 22 and 23 are located adjacent the side walls 15 and 16 and are spaced about 180° from each other.

The grinder 14 has a housing 25 adjacent to the mixing chamber 13, a grinder screw 26 axially rotatable within the housing 25 and a customary grinding plate 27 at the outer end of the housing 25 and through which the material being ground is forced by the screw 26.

The grinder housing 25 which is adjacent to the mixing chamber wall section 19 is provided with an access opening 28 that coincides with an access opening 29 in the mixing chamber bottom wall section 19.

As is illustrated in FIG. 9 the central mixing blade means 24 comprises a mixing-propelling blade means with an inclined pusher plate 30 that is movable across the aligned openings 28 and 29 on rotation of the mixing means as indicated by the arrow 31. This movement of the pusher plate 30 propels the material such as the raw meat through the openings and into the grinder housing 25 where the grinder screw 26 forces it to the end of the housing and through the above described grinder plate 27.

The apparatus also includes clamping means that will be described in detail hereinafter for clamping together the areas 32 of the chamber wall 19 that are adjacent and surround the chamber access opening 29 and the areas 33 of the grinder housing 25 that are adjacent and surround the grinder access opening 28. This clamping of these surfaces together provides a substantially fluid tight seal that as illustrated is a metal-to-metal contact.

As illustrated in FIG. 9 the upstream side of the grinder housing 25 which is the side facing the oncoming pusher plate 30 is sloped upwardly and outwardly as shown at 34 to provide a chute leading from the mixing chamber 13 to the grinder screw 26.

As is shown in FIG. 9 the preferred construction has the access openings 28 and 29 located substantially at the extreme bottom of the mixing chamber 13 and each opening has its upstream edge 35 and 36 at a higher elevation than the corresponding downstream edge 37 and 38. This aids in moving the grindable material from the chamber 13 into the grinder.

As is shown in FIGS. 8-10 the grinder housing 25 is provided with forward 39 and rear 40 support rails that support the grinder housing on a base 41. The grinder screw 26 has a rear drive portion 42 extending to the exterior of the housing 25 and releasably secured in a rotatable drive member 43 which rotates the screw during the grinding operation. In order to secure the grinder housing 25 on the base 41 and simultaneously retain the screw end 42 in driving engagement with the drive member 43 there are provided clamp means on opposite sides of the housing 25 at the bottom thereof.

As shown this clamp means comprises side blocks 44 on opposite sides of the base 41 with each block as shown in FIG. 10 having a pair of forwardly projecting pins 45 releasably engaging corresponding holes in the rear support rail 40.

The clamp means also comprises side clamps 46 each comprising a forwardly projecting bar 47 which has connected to its forward end a catch 48 rotatable about a transverse hinge pin 49. Each side catch 48 has a bottom notch 50 that engages a laterally projecting pin 51 that are on opposite sides of the forward support rail 39.

As can be seen from the above description the side clamps 46 not only lock the housing 25 on the support base 41 but also hold the housing in a rear position to retain the rear drive portion 42 of the grinder screw in driving engagement with the drive member 43. The clamp means that clamps together the bottom of the mixing chamber 19 and the top of the grinder housing 25 as previously described comprises a flange member 52 extending generally horizontally on one side of the mixing chamber wall 17 and engaged by a clamp means comprises a toggle clamp 53 of customary construction. This flange member 52 with a second generally horizontal flange member 54 on the other side of the peripheral wall 17 and the toggle clamp 53 cooperate to retain releasably the mixing chamber in position. The flange 54 is positioned beneath a horizontal structural member 55 of the supporting frame 11 and the co-operating surfaces areas 32 and 33 of the chamber wall 19 and grinder housing 25 are arcuately shaped so as to function as sliding fulcrums for self-alignment of the cooperating parts. The result of this is that downward pressure indicated by the arrow 56 in FIG. 3 exerted by the toggle clamp 53 holds the surfaces 32 and 33 in sealing engagement and presses the opposite flange 54 upwardly against the bottom of the horizontal structural member 55. The result is that the single ordinary toggle clamp 53 secures the mixing chamber 13 on the supporting frame 11 and retains the bottom of the chamber 13 in fluid tight contact with the top of the grinder housing 25.

The mixing blade means 22 and 23 that are adjacent the side walls 15 and 16 of the chamber 13 each comprises a radially projecting bar 57 and a pair of spaced mixing-propelling blades 58 and 59. One of these blades 58 is relatively short and is positioned at the outer end of its radially projecting bar 22 while the other blade 59 is positioned intermediate the end blade 58 and the axis of rotation 20. Both blades are angled and twisted to urge the material being mixed toward the access opening 29 which as shown is at substantially the vertical center of the mixing chamber 13. During rotation of the shaft 21 the inner end 60 of each outer blade 58 overlaps the side edges 61 of the access opening 29 to a small extent.

The mixing-propelling blade means 24 that pushes the material through the access openings has each end thereof at an angle of less than 90° to the corresponding mixing blade 22 and 23. In the preferred embodiment as illustrated in FIG. 6 this angle is about 45° with each end of the blade 24 leading its corresponding mixing blade 22 or 23 by this angular distance in the direction of rotation indicated by the arrow 62. This spacing is important because it increases the spacing between the leading edge 63 of the mixing blade 24 and the forwardly spaced blade 23 to a distance such that there will be no bridging across of material carried by the leading edges 63. Thus the spacing between the leading edge 63 and the next blade 23 is about 135° so that it is virtually impossible for material and even adhesive material such as raw meat to bridge this space and be carried around with the rotating mixing means.

The mixing means shaft 21 as illustrated in FIG. 7 has one end adjacent a motor driven drive shaft 64 that extends through a side wall 15 of the mixing chamber. This drive shaft 64 has a groove 65 therein that normally holds a transverse lock bar 66 on the adjacent end of the shaft. Because the mixing blade means 22, 23 and 24 are mounted on the shaft 21 the entire unit may be assembled in the mixing chamber 13 and removed therefrom as a unit. In the illustrated embodiment the releasable securing means comprises a long bolt 67 extending through the hollow coaxial interior 68 of the shaft 21 and adapted to be screwed into a threaded opening 69 in the shaft 64. FIG. 7 shows this bolt 67 partially withdrawn.

This bolt 67 has an outer end 69 accessible from the exterior of the side 16 of the chamber so that the bolt can be unscrewed and removed as shown in FIG. 7 for removing the mixing blade means and shaft 21 as a unit. This outer end 69 comprises a cylindrical end portion 70, a surrounding collar 71 and a larger cylindrical inner end 72 that is received within the central opening 73 in an outer cap 74. As soon ast the bolt 67 has been withdrawn entirely the mixing means shaft 21 and the mixing elements 22–24 attached thereto may be removed as a unit for cleaning.

As is shown in FIG. 1 the machinery compartment 12 encloses an electric motor 75 which drives a gear reducer 76 which in turn drives the rotatable drive member 43 for the grinder shaft 42. The gear reducer 76 also rotates a small sprocket wheel 77 which rotates a larger sprocket wheel 78 by way of a chain drive 79. The large sprocket wheel 78 is mounted on the inner end of the drive shaft 64.

As shown in FIG. 7 there is provided a sealing gasket 80 around the outer end of the drive shaft 64 and between the adjacent surfaces of the side wall 15 and the wall 81 of the machinery compartment 12.

The mixer-grinder apparatus of this invention is ideally suited for handling relatively small quantities of material such as the exemplary raw meat. Thus it can be used to advantage for mixing and grinding up to 100 pounds of coarsely cut raw beef with 80 pounds being the ideal amount. With an amount of 70–80 pounds of coarsely cut raw beef it can mix and grind at the rate of about 50–60 pounds per minute.

The mixing operation in this apparatus as in the three previous patents listed above mixes by a combination of actions including tossing the meat back and forth across the space in the top of the chamber 13 above the shaft 21.

In the preferred construction the two blades 58 and 59 in each set are spaced apart a sufficient distance that the meat will not form a large ball and be carried around by each mixing blade structure 22 and 23. Thus preferably as illustrated the blade 58 is at the end of its bar 57 while the other blade 59 is approximately halfway between the outer blade 58 and the shaft 21.

Thus the mixer-grinder apparatus of this invention handles relatively small amounts of coarsely cut meat efficiently and quickly to form a homogeneous mixture in the mixing chamber before passing to the grinder. In addition, the various parts are retained in operating relationship by the releasable two side clamps 46 at the base of the apparatus and the one toggle clamp 53 on the side so that this combination with the screw threaded retaining bolt 67 for the mixer device 21–24 permits rapid assembly of the parts of the apparatus for operation and rapid disassembly for cleaning after each session of mixing and grinding.

Having described my invention as related to the embodiment shown in the accompanying drawings, it is my invention that the invention be not limited by any of the details of description, unless otherwise specified, but rather be construed broadly within its spirit and scope as set out in the appended claims.

I claim:

1. Apparatus for mixing and grinding subdivided grindable material, comprising: a mixing chamber for said material having side walls and a peripheral wall including a bottom of arcuate section beneath a transverse axis of rotation; mixing means including a shaft extending across said chamber at said axis and rotatable therearound and mixing blade means spaced along said shaft at least some of which are adjacent to said side walls; and a grinder having a housing adjacent to said chamber, a grinder screw in said housing and an access opening in said housing, peripheral wall having an access opening coinciding with said housing access opening, and said blades including a mixing-propelling blade means rotatable across said access openings for propelling said material therethrough into said grinder, said grinder housing being sloped upwardly and outwardly at the upstream side of its access opening relative to the direction of rotation of said mixing-propelling blade means to provide a sloped chute leading from said chamber to the grinder screw.

2. Apparatus for mixing and grinding subdivided grindable material, comprising: a mixing chamber for said material having side walls and a peripheral wall including a bottom of arcuate section beneath a transverse axis of rotation; mixing means including a shaft extending across said chamber at said axis and rotatable therearound and mixing blade means spaced along said shaft at least some of which are adjacent to said side walls; and a grinder having a housing adjacent to said chamber, a grinder screw in said housing and an access opening in said housing, said peripheral wall having an access opening coinciding with said housing access opening, and said blades including a mixing-propelling blade means rotatable across said access openings for propelling said material therethrough into said grinder, said access openings being located substantially at the bottom of said chamber, each opening having upstream and downstream side edges and with said upstream edges being at a higher elevation than the downstream edge.

3. Apparatus for mixing and grinding subdivided grindable material, comprising: a mixing chamber for said material having side walls and a peripheral wall including a bottom of arcuate section beneath a transverse axis of rotation; mixing means including a shaft extending across said chamber at said axis and rotatable therearound and mixing blade means spaced along said shaft at least some of which are adjacent to said side walls; and a grinder having a housing adjacent to said chamber, a grinder screw in said housing and an access opening in said housing, said peripheral wall having an access opening coinciding with said housing access opening, and said blades including a mixing-propelling blade means rotatable across said access openings for propelling said material therethrough into said grinder, said mixing blade means that are adjacent said side walls each comprising a radially projecting bar and a pair of spaced blades extending from a bar including one relatively short blade at the end of said bar and a longer blade intermediate the end blade and said axis of rotation with both blades angled to urge said material toward said access opening during rotation of the mixing means.

4. The apparatus of claim 2 wherein said grinder housing is sloped upwardly and outwardly at the upstream side of its access opening to provide a chute leading from said chamber to the grinder screw, said upstream edge of said chamber wall opening substantially coinciding with the upper end of said chute.

5. Apparatus for mixing and grinding subdivided grindable material, comprising: a mixing chamber for said material having side walls and a peripheral wall including a bottom of arcuate section beneath a transverse axis of rotation; mixing means including a shaft extending across said chamber at said axis and rotatable therearound and mixing blade means spaced along said shaft at least some of which are adjacent to said side walls; a grinder having a housing adjacent to said chamber, a grinder screw in said housing and an access opening in said housing, said peripheral wall having an access opening coinciding with said housing access opening, and said blades including a mixing-propelling blade means rotatable across said access openings for propelling said material therethrough into said grinder; clamping means for clamping together the areas of said chamber wall adjacent its said access opening and the areas of said grinder housing adjacent its said access opening in substantial fluid sealing arrangement; a supporting frame for said apparatus; securing means operated by said clamping means for simultaneously releasably securing said chamber on said supporting frame; a base on which said grinder housing is slidably held; a plurality of fixed retaining pin members attached to said base; a drive member releasably retaining said grinder screw for rotation thereof; and clamp means in releasable engagement with said plurality of fixed retaining pin members for simultaneously releasably locking said grinder housing on said base and said grinder screw in driving engagement with said drive member, said access openings being located substantially at the bottom of said chamber, each opening having upstream and downstream side edges and with the upstream edge being at a higher elevation than the downstream edge, said securing means comprising a flange member on one side of said mixing chamber engaged by said clamp means and a flange member on the opposite side of said mixing chamber engaging said supporting frame, said flange members being positioned such that pressure of said clamping means simultaneously holds said opposite flange in engagement with said frame and maintains said fluid sealing arrangement.

6. The apparatus of claim 5 wherein said clamped together areas on said chamber and grinder housing are shaped to function as sliding fulcrums for self-alignment of said openings.

7. Apparatus for mixing and grinding subdivided grindable material, comprising: a mixing chamber for said material having side walls and a peripheral wall including a bottom of arcuate section beneath a transverse axis of rotation; mixing means including a shaft extending across said chamber at said axis and rotatable therearound and mixing blade means spaced along said shaft at least some of which are adjacent to said side walls; a grinder having a housing adjacent to said chamber, a grinder screw in said housing and an access opening in said housing, said peripheral wall having an access opening coinciding with said housing access opening, and said blades including a mixing-propelling blade means rotatable across said access openings for propelling said material therethrough into said grinder; clamping means for clamping together the areas of said chamber wall adjacent its said access opening and the areas of said grinder housing adjacent its said access opening in substantial fluid sealing arrangement; a supporting frame for said apparatus; and securing means operated by said clamping means for simultaneously releasably securing said chamber on said supporting frame, said mixing blade means that are adjacent said side walls each comprising a radially projecting bar and a pair of spaced blades extending from a bar including one relatively short blade at the end of said bar and a longer blade intermediate the end blade and said axis of rotation with both blades angled to urge said material toward said access opening during rotation of the mixing means.

8. The apparatus of claim 7 wherein each said mixing blade bar and an adjacent end of said mixing-propelling blade means are at an angle of less than 90° to each other.

9. The apparatus of claim 8 wherein said angle is about 45°.

* * * * *